United States Patent
Carolan et al.

(10) Patent No.: US 7,122,072 B2
(45) Date of Patent: Oct. 17, 2006

(54) CONTROLLED HEATING AND COOLING OF MIXED CONDUCTING METAL OXIDE MATERIALS

(75) Inventors: Michael Francis Carolan, Allentown, PA (US); Matthew James Watson, Bethlehem, PA (US); Eric Minford, Laurys Station, PA (US); Stephen Andrew Motika, Kutztown, PA (US); Dale M. Taylor, Salt Lake City, UT (US)

(73) Assignee: Air Products and Chemicals, Inc., Allentown, PA (US)

( * ) Notice: Subject to any disclaimer, the term of this patent is extended or adjusted under 35 U.S.C. 154(b) by 210 days.

(21) Appl. No.: 10/714,996

(22) Filed: Nov. 17, 2003

(65) Prior Publication Data

US 2005/0106439 A1   May 19, 2005

(51) Int. Cl.
*B01D 53/22* (2006.01)
*H01M 8/10* (2006.01)

(52) U.S. Cl. .................... 95/54; 96/4; 96/9; 96/10; 204/252; 204/295; 429/30; 429/33; 502/527.16

(58) Field of Classification Search .............. 95/54; 96/4, 9, 10; 204/252, 295, 421; 429/30, 429/33, 191, 193; 502/527.16
See application file for complete search history.

(56) References Cited

U.S. PATENT DOCUMENTS

| | | | | |
|---|---|---|---|---|
| 4,170,530 A | * | 10/1979 | Watanabe et al. | 204/426 |
| 5,160,713 A | * | 11/1992 | Mazanec et al. | 423/210 |
| 5,174,866 A | * | 12/1992 | Chen et al. | 205/634 |
| 5,240,473 A | * | 8/1993 | Carolan et al. | 95/54 |
| 5,240,480 A | * | 8/1993 | Thorogood et al. | 96/4 |
| 5,569,633 A | * | 10/1996 | Carolan et al. | 502/4 |
| 5,648,304 A | * | 7/1997 | Mazanec et al. | 501/134 |
| 5,681,373 A | * | 10/1997 | Taylor et al. | 96/11 |
| 5,723,035 A | * | 3/1998 | Mazanec et al. | 204/295 |
| 5,725,965 A | | 3/1998 | Wachsman et al. | |
| 5,817,597 A | * | 10/1998 | Carolan et al. | 502/400 |
| 5,820,655 A | * | 10/1998 | Gottzmann et al. | 95/54 |
| 5,911,860 A | | 6/1999 | Chen et al. | |
| 5,976,223 A | * | 11/1999 | Prasad et al. | 95/54 |
| 5,980,840 A | * | 11/1999 | Kleefisch et al. | 422/211 |
| 6,010,614 A | * | 1/2000 | Keskar et al. | 205/765 |
| 6,056,807 A | * | 5/2000 | Carolan et al. | 96/4 |
| 6,090,500 A | * | 7/2000 | Ishihara et al. | 429/33 |
| 6,146,445 A | * | 11/2000 | Chen et al. | 95/45 |
| 6,214,066 B1 | * | 4/2001 | Nataraj et al. | 48/198.2 |
| 6,264,811 B1 | * | 7/2001 | Wang et al. | 204/295 |
| 6,488,739 B1 | * | 12/2002 | Mazanec et al. | 95/54 |
| 6,503,296 B1 | * | 1/2003 | Vigeland et al. | 95/54 |
| 6,514,314 B1 | * | 2/2003 | Sirman et al. | 95/54 |
| 6,521,202 B1 | * | 2/2003 | Vaughey et al. | 423/599 |

(Continued)

OTHER PUBLICATIONS

Hendricksen et al., "Prospects and problems of dense oxygen permeable membranes", Catalysis Today, 56 (2000) 283-295.

(Continued)

*Primary Examiner*—Jason M. Greene
(74) *Attorney, Agent, or Firm*—Keith D. Gourley

(57) ABSTRACT

Method for processing an article comprising a mixed conducting metal oxide material, which method comprises (a) contacting the article with an oxygen-containing gas and reducing or increasing the temperature of the oxygen-containing gas; (b) when the temperature of the oxygen-containing gas is reduced, reducing the oxygen activity in the oxygen-containing gas; and (c) when the temperature of the oxygen-containing gas is increased, increasing the oxygen activity in the oxygen-containing gas.

33 Claims, 5 Drawing Sheets

U.S. PATENT DOCUMENTS

| | | | |
|---|---|---|---|
| 6,537,465 B1 * | 3/2003 | Gottzmann et al. | 252/373 |
| 6,539,719 B1 * | 4/2003 | Prasad et al. | 60/649 |
| 6,544,404 B1 * | 4/2003 | Mazanec et al. | 205/765 |
| 6,562,105 B1 * | 5/2003 | Gottzmann | 95/54 |
| 6,592,782 B1 * | 7/2003 | MacKay et al. | 252/500 |
| 6,602,324 B1 * | 8/2003 | Stein et al. | 95/54 |
| 6,623,714 B1 * | 9/2003 | Shreiber et al. | 423/219 |
| 6,702,570 B1 * | 3/2004 | Shah et al. | 431/11 |
| 6,726,893 B1 * | 4/2004 | Lee et al. | 423/658.2 |
| 6,786,952 B1 * | 9/2004 | Risdal et al. | 95/54 |
| 2004/0186018 A1 * | 9/2004 | Carolan et al. | 502/527.16 |
| 2005/0031531 A1 * | 2/2005 | Stein et al. | 423/579 |

OTHER PUBLICATIONS

Adler, Stuart B., "Chemical Expansivity of Electrochemical Ceramics", J. Am. Ceram. Soc., 84 (9) 2117-19 (2001).

* cited by examiner

US 7,122,072 B2

CONTROLLED HEATING AND COOLING OF MIXED CONDUCTING METAL OXIDE MATERIALS

STATEMENT REGARDING FEDERALLY SPONSORED RESEARCH OR DEVELOPMENT

This invention was made with government support under Contract No. 70NANB4H1503 between Air Products and Chemicals, Inc. and the U.S. Department of Commerce, National Institute of Standards and Technology. The Government has certain rights to this invention.

BACKGROUND OF THE INVENTION

Ceramic materials containing certain mixed metal oxide compositions possess both oxygen ion conductivity and electronic conductivity at elevated temperatures. These materials, known in the art as mixed conducting metal oxides, may be used in applications including gas separation membranes and membrane oxidation reactors. These ceramic membranes are made of selected mixed metal oxide compositions and have been described as ion transport membranes (ITM). A characteristic property of these materials is that their oxygen stoichiometry is a thermodynamic function of temperature and oxygen partial pressure wherein the equilibrium oxygen stoichiometry decreases with increasing temperature and with decreasing oxygen partial pressure.

It is known that the dimensions of most materials change with changing temperature due to thermal expansion and contraction. In addition to these thermal dimensional changes, mixed conducting metal oxide materials undergo chemical dimensional changes that are a function of the metal oxide oxygen stoichiometry. At isothermal conditions, an article made of mixed conducting metal oxide material will increase in dimensions with decreasing oxygen stoichiometry. At isothermal conditions, the oxygen stoichiometry decreases with decreasing oxygen partial pressure. Since the equilibrium oxygen stoichiometry increases with decreasing temperature, an article made of mixed conducting metal oxides will contract due to both thermal and chemical dimensional changes as the temperature decreases. Conversely, an article made of mixed conducting metal oxides will expand by both thermal and chemical dimensional changes as the temperature increases at a constant oxygen partial pressure. This is described in an article entitled "Chemical Expansivity of Electrochemical Ceramics" by S. B. Adler in *J. Am. Ceram. Soc.* 84 (9) 2117–19 (2001).

Dimensional changes therefore result from equilibrium oxygen stoichiometry changes in mixed conducting metal oxide materials. Changing the temperature at a constant oxygen partial pressure or changing the oxygen partial pressure at a constant temperature will change the equilibrium oxygen stoichiometry of the mixed conducting metal oxide material. When a mixed conducting metal oxide is used as an ion transport membrane, for example, an oxygen partial pressure difference across the membrane creates a difference in the equilibrium oxygen stoichiometry at each of the two surfaces of the membrane, which in turn creates the thermodynamic driving force for oxygen ions to diffuse through the membrane.

During startup of a gas separation system using mixed conducting metal oxide membranes, the temperature is increased and the oxygen partial pressure on one or both sides of the membrane may change. The equilibrium oxygen stoichiometry of the membrane material will change in response to the changes in temperature and oxygen partial pressure. Oxygen anions will diffuse into or out of the membrane material and the membrane material will approach its equilibrium oxygen stoichiometry value. As the oxygen stoichiometry and temperature changes, the dimension of the membrane will change. The time required for the membrane to reach chemical equilibrium with the oxygen partial pressures on the surfaces of the membrane will depend on the oxygen anion diffusion rate into or out of the membrane. The time required for equilibration to occur is a function of the material composition, the temperature, and the dimension of the membrane modules.

Different membrane compositions will have different oxygen anion diffusivities, and compositions with higher diffusivities will equilibrate with the gas phase faster, all other factors being equal. For a given membrane composition, the oxygen anion diffusivity increases exponentially with temperature. Therefore, equilibration times decrease with increasing temperature. Finally, the equilibration time increases approximately with the square of the characteristic dimension (e.g., length or thickness) of the parts in the membrane modules. Therefore, thinner parts will equilibrate faster than thicker parts, all other factors being equal. As the thickness of a part increases and as the temperature decreases, it becomes increasingly difficult to keep the interior of the part in equilibrium with the gas phase due to sluggish diffusion of oxygen anions into or out of the part.

It is known that temperature gradients in a mixed conducting metal oxide ceramic part can create differential strains due to differential thermal expansion and contraction. Similarly, oxygen stoichiometry gradients in a ceramic part can create differential strains due to differential chemical expansion and contraction. This gradient in oxygen stoichiometry may be sufficiently large to create a correspondingly large differential chemical expansion, and therefore large mechanical stresses, that lead to failure of the part. Therefore, it is desirable to avoid differential chemical expansion or at least to control the differential chemical expansion to below maximum allowable values.

There is a need in applications of mixed conducting metal oxide ceramics for methods to heat or cool ceramic articles at faster rates without producing unacceptable strains in the articles. However, few solutions have been proposed to solve this problem to date. In one approach, U.S. Pat. No. 5,911,860 discloses the use of composite membranes containing mechanically enhancing constituents such as metals to improve the mechanical properties of mixed conducting metal oxide membranes. Membranes are disclosed that have a matrix material which conducts at least one type of ion, preferably oxygen ions, and at least one constituent which is physically distinct from the matrix material and which enhances the mechanical properties, the catalytic properties, and/or the sintering behavior of the matrix material. The constituent is present in a manner which precludes continuous electronic conductivity through the constituent across the membrane. In a preferred embodiment the matrix material is a mixed conductor which exhibits both electronic and oxygen ion conductivity. The constituent preferably is a metal such as silver, palladium, or a mixture thereof. In other embodiments, the constituent is a ceramic or other electrically nonconductive material. These proposed membrane compositions thus have mechanical properties that allow faster heating and cooling than membrane compositions previously known in the art.

In an article entitled "Prospects and Problems of Dense Oxygen Permeable Membranes", *Catalysis Today* 56, (2000) 283–295, P. V. Hendricksen et al describe the problem of mechanical failure of mixed conductor membranes under oxygen partial pressure gradients at steady state operating conditions. It is disclosed that oxygen partial pressure gradients will produce differential chemical expansion that can lead to mechanical failure of the membrane. It is proposed that surface kinetic resistances will decrease the maximum tensile stress in a membrane, especially as the membrane thickness is decreased. Therefore, using thin membranes that have surface kinetic resistances may reduce the maximum tensile stress. However, while the surface kinetic resistances may reduce the maximum tensile stress, the surface kinetic resistances will also decrease the oxygen flux obtained from the membrane, and this in turn would increase the membrane area required for a given oxygen production rate and hence decrease the economic benefit of the membrane process.

U.S. Pat. No. 5,725,965 teaches the use of functionally gradient, compositionally layered, solid state electrolytes and membranes to prevent chemical reduction of membrane layers during operation. This layered membrane structure may reduce the differential chemical expansion during steady state operation but does not address the problem of chemical dimensional changes caused by heating or cooling of the membrane structure.

There is a need in the art for improved methods to reduce the potential for mechanical damage due to chemical dimensional changes during the heating and cooling of articles and systems fabricated from mixed conducting metal oxide materials, both in the manufacturing of parts for such systems and in the operation of gas separation and membrane reactor systems under transient temperature conditions. This need is addressed by embodiments of the invention disclosed below and defined by the claims that follow.

BRIEF SUMMARY OF THE INVENTION

Embodiments of the present invention include a method for processing an article comprising a mixed conducting metal oxide material, which method comprises (a) contacting the article with an oxygen-containing gas and reducing or increasing the temperature of the oxygen-containing gas; (b) when the temperature of the oxygen-containing gas is reduced, reducing the oxygen activity in the oxygen-containing gas; and (c) when the temperature of the oxygen-containing gas is increased, increasing the oxygen activity in the oxygen-containing gas.

The article may be characterized by a stoichiometric composition. When the article is cooled, the oxygen activity in the oxygen-containing gas may be reduced while cooling so that the oxygen activity is substantially in chemical equilibrium with the stoichiometric composition of the mixed conducting metal oxide material during at least a portion of the cooling. When the article is heated, the oxygen activity in the oxygen-containing gas may be increased during heating so that the oxygen activity is substantially in chemical equilibrium with the stoichiometric composition of the mixed conducting metal oxide material during at least a portion of the heating.

The oxygen-containing gas may comprise a diluent and the oxygen activity in the oxygen-containing gas may be changed by changing concentration of the diluent therein. Also, the oxygen activity in the oxygen-containing gas may be changed by changing the total pressure of the oxygen-containing gas.

The oxygen-containing gas may comprise one or more components selected from the group consisting of oxygen, nitrogen, nitric oxide, nitrous oxide, carbon monoxide, carbon dioxide, and water. The diluent may comprise one or more components selected from the group consisting of nitrogen, argon, helium, water, and carbon dioxide. The oxygen-containing gas may comprise dioxygen ($O_2$) and nitrogen.

In another embodiment, the invention includes a method for processing an article comprising a mixed conducting metal oxide material. The method comprises
  (a) contacting the article with an oxygen-containing gas comprising dioxygen ($O_2$) and reducing or increasing the temperature of the oxygen-containing gas;
  (b) when the temperature of the oxygen-containing gas is reduced, reducing the oxygen partial pressure in the oxygen-containing gas; and
  (c) when the temperature of the oxygen-containing gas is increased, increasing the oxygen partial pressure in the oxygen-containing gas.

The article may be characterized by a stoichiometric composition. When the article is cooled, the oxygen partial pressure in the oxygen-containing gas may be reduced while cooling so that the oxygen partial pressure is substantially in chemical equilibrium with the stoichiometric composition of the mixed conducting metal oxide material during at least a portion of the cooling. When the article is heated, the oxygen partial pressure in the oxygen-containing gas may be increased during heating so that the oxygen partial pressure is substantially in chemical equilibrium with the stoichiometric composition of the mixed conducting metal oxide material during at least a portion of the heating.

The oxygen-containing gas may comprise a diluent and the oxygen partial pressure in the oxygen-containing gas may be changed by changing the concentration of the diluent therein. The oxygen partial pressure in the oxygen-containing gas may be changed by changing the total pressure of the oxygen-containing gas. The diluent may be selected from the group consisting of nitrogen, argon, helium, carbon dioxide, water, and mixtures thereof.

The oxygen-containing gas may be a mixture formed by the combustion of an oxidant gas containing dioxygen ($O_2$) and a fuel and further wherein the oxygen partial pressure in the oxygen-containing gas is changed by changing the relative amounts of the oxidant gas and the fuel prior to combustion. The oxidant gas may be air and the fuel may comprise methane.

An alternative embodiment if the invention includes a method for heating or cooling an article comprising a mixed conducting metal oxide material having a stoichiometric composition. This method comprises (a) contacting the article with an oxygen-containing gas while changing the temperature of the article; and (b) at any temperature while changing the temperature of the article, maintaining the oxygen activity in the oxygen-containing gas at a value that is less than the oxygen activity in the oxygen-containing gas that would be in chemical equilibrium with the stoichiometric composition of the mixed conducting metal oxide material in the article at the same temperature.

Another embodiment of the invention includes a method of operating an ion transport membrane system comprising
  (a) providing at least one membrane module comprising a membrane made of mixed conducting metal oxide material;
  (b) contacting the membrane with a heated oxygen-containing gas comprising dioxygen ($O_2$) while the temperature of the membrane is reduced or increased;
  (c) when the temperature of the membrane is reduced, reducing the oxygen partial pressure in the oxygen-containing gas; and (d) when the temperature of the membrane is increased, increasing the oxygen partial pressure in the oxygen-containing gas.

The membrane may be characterized by a stoichiometric composition. When the membrane is cooled, the oxygen partial pressure in the oxygen-containing gas may be reduced while cooling the membrane so that the oxygen partial pressure is substantially in chemical equilibrium with the stoichiometric composition of the membrane during at least a portion of the cooling. When the membrane is heated, the oxygen partial pressure in the oxygen-containing gas may be increased while heating the membrane so that the oxygen partial pressure is substantially in chemical equilibrium with the stoichiometric composition of the membrane during at least a portion of the heating.

The oxygen partial pressure in the oxygen-containing gas in contact with the membrane may be changed by mixing a diluent gas with the oxygen-containing gas. The oxygen partial in the oxygen-containing gas in contact with the membrane may be changed by changing the total pressure of the oxygen-containing gas. The heated oxygen-containing gas may be provided by the direct combustion of an oxidant gas comprising dioxygen ($O_2$) with a fuel.

An alternative embodiment of the invention includes a method of operating an ion transport membrane system comprising
  (a) providing two or more membrane modules operating in series, each module comprising a membrane made of mixed conducting metal oxide material;
  (b) contacting each membrane with a heated oxygen-containing gas comprising dioxygen ($O_2$) while reducing the temperature of each membrane or increasing the temperature of each membrane;
  (c) when the temperature of each membrane is reduced, reducing the oxygen partial pressure in the oxygen-containing gas in each membrane module such that the oxygen partial pressure in the oxygen-containing gas in one of the membrane modules is different than the oxygen partial pressure in the oxygen-containing gas in another of the membrane modules; and
  (d) when the temperature of each membrane is increased, increasing the oxygen partial pressure in the oxygen-containing gas in each membrane module such that the oxygen partial pressure in the oxygen-containing gas in one of the membrane modules is different than the oxygen partial pressure in the oxygen-containing gas in another of the membrane modules.

Another embodiment of the invention includes an ion transport membrane system comprising (a) at least one membrane module having a membrane comprising mixed conducting metal oxide material; (b) means for contacting the membrane with a heated oxygen-containing gas and means for reducing or increasing the temperature of the membrane; (c) means for reducing the oxygen partial pressure in the oxygen-containing gas when the temperature of the membrane is reduced; and (d) means for increasing the oxygen partial pressure in the oxygen oxygen-containing gas when the temperature of the membrane is increased.

In this system, the mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr and Ga; wherein $0 \leq x \leq 1$, $0 \leq y \leq 1$, and $0.95 \leq w \leq 1.05$; and wherein $\delta$ is a number that renders the compound charge neutral. This mixed conducting metal oxide material may have the general stoichiometric composition $(La_xCa_{1-x})_w FeO_{3-\delta}$ wherein $1.0 > x > 0.5$, $1.1 \geq w \geq 1.0$, and $\delta$ is a number which renders the composition charge neutral.

The mixed conducting metal oxide material may have the general stoichiometric composition $(La_xSr_{1-x})_w CoO_{3-\delta}$ wherein $1.0 > x > 0.1$, $1.05 \geq w > 0.95$, and $\delta$ is a number which renders the composition charge neutral. The mixed conducting metal oxide material may have the general stoichiometric composition $(La_{0.4}Sr_{0.6})_w CoO_{3-\delta}$ wherein $1.05 \geq w > 0.95$ and $\delta$ is a number which renders the composition charge neutral.

The system may further comprise a combustor for combusting an oxidant gas comprising dioxygen ($O_2$) with a fuel to generate a combustion product that provides the heated oxygen-containing gas. The system may further comprise a fired heater to further heat the heated oxygen-containing gas by indirect heat transfer with hot combustion gases in the fired heater.

A final embodiment of the invention includes a method of operating an ion transport membrane system comprising (a) providing a membrane module comprising a membrane made of mixed conducting metal oxide material, wherein the membrane has a first side and a second side; (b) heating or cooling the membrane; and (c) while heating or cooling the membrane, contacting the first side of the membrane with a first oxygen-containing gas and contacting the second side of the membrane with a second oxygen-containing gas, wherein at any time during the heating or cooling the oxygen activity in the first oxygen-containing gas is different than the oxygen activity in the second oxygen-containing gas.

The first and second oxygen-containing gases each may comprise dioxygen ($O_2$) and at any time during the heating or cooling the oxygen partial pressure in the first oxygen-containing gas may be different than the oxygen partial pressure in the second oxygen-containing gas.

DETAILED DESCRIPTION OF THE INVENTION

Figure 1:
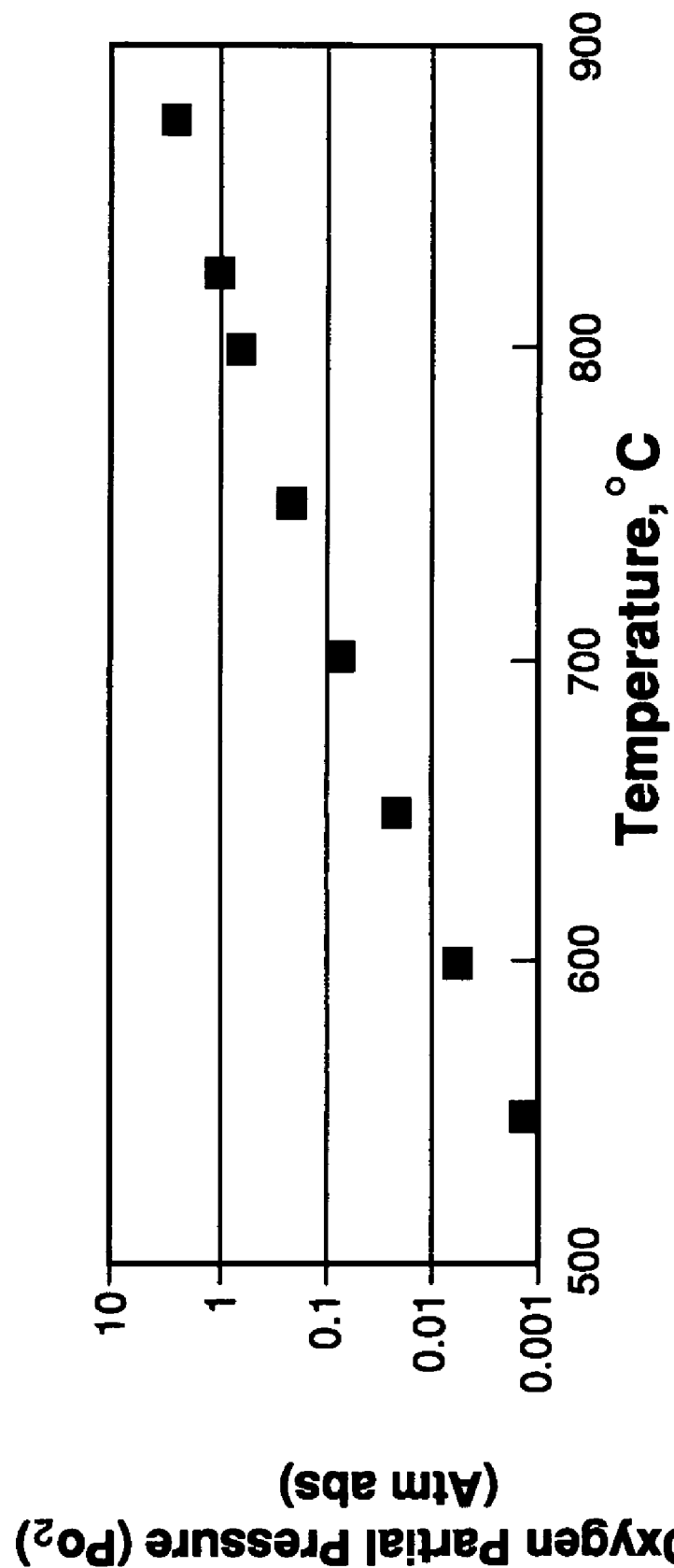
FIG. 1 is a plot of temperature vs equilibrium oxygen partial pressure for a constant stoichiometric composition of a mixed conducting metal oxide ceramic material having the general composition $La_{0.4}Sr_{0.6}CoO_{2.84}$.

Embodiments of the present invention address the problem of stoichiometrically-related stresses in mixed conducting metal oxide articles and systems during heating and cooling. This problem may be alleviated when a mixed conducting metal oxide material or article is heated or cooled in contact with an oxygen-containing gas by controlling the oxygen activity in the oxygen-containing gas during heating and cooling in a selected temperature range to values that are substantially in chemical equilibrium, or as close as possible to chemical equilibrium, with the oxygen stoichiometry of the mixed conducting metal oxide material while changing the temperature of the material or article in the selected temperature range. The term "activity" as used herein is the thermodynamic function, a, having the usual definition (see, for example, *Thermodynamics*, G. N. Lewis and M. Randall, revised by K. S. Pitzer and L. Brewer, $2^{nd}$ Edition, McGraw-Hill, 1961, pp 242–249).

When the mixed conducting metal oxide material or article is in contact with a gas mixture containing dioxygen or $O_2$, the oxygen partial pressure may be controlled during heating and cooling in a selected temperature range at values that are substantially in chemical equilibrium, or as close as possible to chemical equilibrium, with the oxygen stoichiometry of the mixed conducting metal oxide material while changing the temperature of the article or system in the selected temperature range. When the oxygen-containing gas is an ideal gas, the oxygen activity is equal to the oxygen partial pressure. The oxygen partial pressure may be controlled in this embodiment by either or both of (1) adjusting the total pressure of the gas mixture and (2) adding to the gas mixture a supplemental gas that has an $O_2$ concentration different than the $O_2$ concentration in the gas mixture. The supplemental gas may be a diluent that contains a lower concentration of $O_2$ than that in the gas mixture. A diluent gas, for example, may contain no $O_2$.

When the mixed conducting metal oxide material or article is in contact with an oxygen-containing gas that does not contain dioxygen or $O_2$, the gas-phase oxygen activity may be controlled during heating and cooling in a selected temperature range at values that are substantially in chemical equilibrium, or as close as possible to chemical equilibrium, with the oxygen stoichiometry of the mixed conducting metal oxide material while changing the temperature of the article or system in the selected temperature range. The oxygen activity may be controlled in this embodiment by either or both of (1) adjusting the total pressure of the gas mixture and (2) adding to the oxygen-containing gas a supplemental gas that has a concentration of an oxygen-containing component different than the concentration of that component in the gas mixture. The supplemental gas may be considered a diluent if it contains a lower concentration of the oxygen-containing component than in the gas mixture. An example of this embodiment is a system in which the gas phase is a mixture of hydrogen and water wherein the oxygen activity in the gas phase is determined by the thermodynamic equilibrium between hydrogen and water.

As used herein, the generic term "oxygen" includes all forms of oxygen comprising the element or moiety having an atomic number of 8. The generic term oxygen therefore includes oxygen ions, gaseous oxygen (dioxygen or $O_2$), and oxygen that exists in compounds in the gaseous, liquid, or solid state. An oxygen-containing gas is defined as a gas or gas mixture that includes, but is not limited to, one or more components selected from the group consisting of air, nitrogen, $O_2$, water, carbon monoxide, carbon dioxide, nitric oxide (NO), and nitrous oxide ($N_2O$). The term "oxygen partial pressure" as used herein means the partial pressure of dioxygen or $O_2$ in a gas mixture containing $O_2$ and other gaseous components.

The indefinite articles "a" and "an" as used herein mean one or more when applied to any feature of the present invention described in the specification and claims. The use of "a" and "an" does not limit the meaning to a single feature unless such a limit is specifically stated.

In the following description, embodiments of the invention are illustrated by heating and/or cooling methods in which the metal oxide material or article is in contact with an oxygen-containing gas that contains dioxygen or $O_2$ wherein the oxygen partial pressure is controlled during heating and cooling to be substantially in chemical equilibrium, or as close as possible to chemical equilibrium, with the oxygen stoichiometry of the mixed conducting metal oxide material. The principles described for these embodiments may be applied analogously to alternative embodiments in which $O_2$ is not present in the oxygen-containing gas; in these alternative embodiments, the oxygen activity is the parameter that is controlled in the gas phase during heating and cooling.

The presence of multiple dimension scales in a single ceramic part may cause differential chemical expansion during isobaric thermal transients in ITM membrane modules and assemblies. For example, U.S. Pat. No. 5,681,373 discloses planar solid-state ITM membrane assemblies comprising multiple layers including a planar porous support with a first surface that is contiguous to a dense separating layer and a second surface that is contiguous to a channeled layer. The diffusion thicknesses or characteristic dimensions of the porous layer, the dense separating layer, and the channel walls in the channeled layer all may be different. This means that the stoichiometric composition of each layer will require different amounts of time to equilibrate with the gas phase oxygen partial pressure during isobaric temperature changes.

The equilibration time of the feature with the largest characteristic dimension, therefore, will determine the heating and cooling rates needed to avoid excessive strain from chemically-induced dimensional changes. The porous layer, which may consist of micron-sized pores defined by micron sized solid grains of metal oxide material would equilibrate most rapidly with the gas phase. The dense separating layer, which may be as thin as several tens of microns, would equilibrate slower than the ceramic phase in the porous layer. The channel walls, which may be several hundreds of microns in thickness or height, would equilibrate slower than the porous layer and dense separating layer.

If a mixed conducting metal oxide ceramic membrane with these features is cooled at a constant oxygen partial pressure ($P_{O2}$) at a rate faster than the rate necessary for the channel walls to equilibrate with the gas phase, but slower than the rate for the porous layer to equilibrate with the gas phase, the porous layer will tend to contract faster than the channeled layer. Since the porous layer and the channeled layer are joined to each other, the porous layer will be placed in a tensile stress and the channeled layer in a compressive stress. If the magnitudes of the stresses are large enough, the ceramic part could break. Therefore, methods are needed to allow mixed conducting metal oxide ceramic parts or articles with large characteristic dimensions to be heated and cooled rapidly.

For a given membrane or ceramic article comprising mixed conducting metal oxide material, the differential chemical expansion may be maintained below a maximum allowable value if temperature changes or oxygen partial pressure changes are controlled at a sufficiently low rate such that the part can equilibrate quickly enough to avoid excessive differential chemical expansion. However, as the part becomes thicker or as the temperature decreases, the allowable temperature and oxygen partial pressure rate of change will become slower and slower. These slow temperature or oxygen partial pressure changes may be undesirable, however, because the time required may increase the cost of a process that manufactures or uses articles comprising mixed conductor metal oxide material.

For example, after sintering, ceramic parts must be cooled from the sintering temperature to room temperature, typically in an air atmosphere. To maintain an acceptable differential expansion, the cooling rate may vary from 1° C. per minute at high temperatures to 1° C. per hour at low temperatures. The entire cooling process may require more than one week. The productivity of the sintering furnaces could be improved, and hence the economics manufacturing could be improved, if a higher cooling rate could be used. By eliminating or minimizing solid state oxygen anion transport within the article during thermal transients, differential chemical expansion strains and the mechanical stresses due to those strains may be minimized or eliminated.

As an example, a ceramic part or article having a general stoichiometric composition of $La_{0.4}Sr_{0.6}CoO_{3-\delta}$, wherein $\delta$ has a value that renders the composition charge neutral, will have an equilibrium stoichiometric composition of $La_{0.4}Sr_{0.6}CoO_{2.79}$ at 900° C. and an oxygen partial pressure ($P_{O2}$) of 1 atm. A representative equilibrium dimension of this material at these conditions will increase by 757 parts per million (ppm) when the $P_{O2}$ is decreased isothermally from 1 atm to 0.209 atm. A ceramic part that is 1 mm thick at 900° C. and a $P_{O2}$ of 1 atm would therefore expand to a thickness of 1.000757 mm when the $P_{O2}$ is isothermally decreased to 0.209 atm. The equilibrium stoichiometric composition of this material in air at 1 atm total pressure and 100° C. is $La_{0.4}Sr_{0.6}CoO_{3.0}$, while at a $P_{O2}$ of 3.2 atm and 900° C. the equilibrium composition is $La_{0.4}Sr_{0.6}CoO_{2.86}$.

An article comprising a mixed conducting metal oxide material having a certain oxygen stoichiometry may be heated and/or cooled by contacting the article with an oxygen-containing gas while changing the temperature of the article and adjusting the oxygen activity in the oxygen-containing gas to a value that is substantially in chemical equilibrium, or as close as possible to chemical equilibrium, with the stoichiometric composition of the mixed conducting metal oxide material over the temperature range of the heating and/or cooling. Typically, the oxygen-containing gas comprises dioxygen or $O_2$, and in this case the gas-phase oxygen partial pressure is maintained so that the ceramic article is substantially in chemical equilibrium with the gas phase or is as close as possible to being in chemical equilibrium with the gas phase. In some embodiments, as discussed earlier, the oxygen-containing gas may comprise oxygen-containing compounds such as carbon dioxide and carbon monoxide in the absence of $O_2$. In these embodiments, the gas phase oxygen activity is determined by the chemical equilibrium between the components of the gas phase.

The terms "article" and "part" are used interchangeably herein and are defined as any element, item, component, or constituent that is fabricated in whole or in part from a mixed conducting metal oxide material. An article or part may consist solely of mixed conducting metal oxide material and may be manufactured by firing green ceramic precursor material in a kiln at sufficiently high temperatures to sinter the precursor and form a ceramic article or part. The article or part may consist of mixed conducting metal oxide material containing a single mixed conducting metal oxide compound or a plurality of mixed conducting metal oxide compounds having different compositions. The article or part may further comprise additional elements or compounds that are not mixed conducting metal oxides including, for example, metals, electronically conductive ceramics, ionically conductive ceramics, and/or non-conducting ceramic materials. In addition, the article or part may be a membrane separator or membrane reactor module that includes mixed conducting metal oxide components as well as piping and other fabrication components made of metal alloys.

If the gas-phase oxygen activity or partial pressure is maintained in chemical equilibrium with the ceramic part or article during heating and/or cooling, oxygen will not diffuse into or out of the article and the oxygen stoichiometry of the article will not change while heating or cooling occurs. This process of heating and cooling at constant composition is defined as isocompositional heating and cooling. By maintaining a constant or nearly constant composition within the ceramic article, the article can be heated or cooled at much higher rates than would be possible if the oxygen stoichiometry of the material in the article changed during heating or cooling. This in turn will improve the productivity of ceramic fabrication while decreasing the mechanical stresses placed on the ceramic articles during manufacture.

These ceramic articles may be components made of mixed conducting metal oxide material wherein the components are parts of membrane modules for oxygen separation and membrane reactor systems. The membrane modules may contain other types of materials in addition to the mixed conducting metal oxide material. The method described above may be used during heating or cooling of membrane modules during startup, shutdown, or any other transient temperature condition. During cooling, the gas phase temperature will be less than the average temperature of the article being cooled, and the gas phase will not be at temperature equilibrium with the article. Conversely, during heating, the gas phase temperature will be greater than the average temperature of the article being heated, and the gas phase also will not be at temperature equilibrium with the article. The objective of controlling the composition of the oxygen-containing gas is to ensure that the overall macroscopic stoichiometric composition of the mixed conducting metal oxide material in the ceramic article remains constant or nearly constant during heating and cooling. During both heating and cooling, the article itself may have an internal temperature gradient and therefore may have localized internal oxygen stoichiometry differences. The oxygen stoichiometry of the article is the overall or macroscopic oxygen stoichiometry of the mixed conducting metal oxide material in the ceramic article.

The term "isocomposition" or "isocompositional" is defined herein as a constant oxygen stoichiometry of a mixed conducting metal oxide material. Isocompositional chemical equilibrium is defined as the chemical equilibrium between an oxygen-containing gas phase and a mixed conducting metal oxide material at a given equilibrium temperature of the gas phase and the mixed conducting metal oxide material. The term "substantially in chemical equilibrium" is defined as the isocompositional chemical equilibrium between the oxygen stoichiometry of a mixed conducting metal oxide material in an article and the gas phase at the gas-phase temperature.

An example of the oxygen partial pressure-temperature equilibrium relationship is shown in FIG. 1 for a mixed conducting metal oxide material having the general stoichiometric composition $La_{0.4}Sr_{0.6}CoO_{2.84}$. This curve is an isocompositional curve of conditions at which the mixed conducting metal oxide is in chemical equilibrium with the gas phase at any temperature on this curve. Other mixed conducting metal oxide compounds will have characteristic isocompositional curves similar to FIG. 1. If the $La_{0.4}Sr_{0.6}CoO_{2.84}$ material of FIG. 1 is initially at 875° C. and a $P_{O2}$ of 2.5 atm, for example and is cooled to ambient temperature, the material may be maintained at a constant oxygen stoichiometry by changing the $P_{O2}$ as the temperature changes by following the isocompositional curve. For example, as the temperature is decreased from 875° C. to 740° C., the $P_{O2}$ would be decreased from 2.5 atm to 0.21 atm. This may be accomplished, for example, by reducing the total gas pressure in the vessel.

To cool from 740° C. to 600° C., nitrogen or another inert gas may be blended into the vessel to decrease the $P_{O2}$ from 0.21 atm to 0.005 atm. As the $P_{O2}$ decreases further, at some point the gas phase oxygen mass transfer kinetics or surface reaction kinetics of the reaction between gas-phase $O_2$ and the mixed metal oxide may become the rate limiting step for transport of oxygen into or out of the membrane. If this situation occurs, the solid state diffusion of oxygen will be faster than the gas phase $O_2$ mass transfer kinetics or surface reaction kinetics. Therefore, there will be no gradients in the solid state oxygen stoichiometry of the membrane material and hence there will be no mechanical strains due to oxygen stoichiometry gradients. Further reduction of the $P_{O2}$ therefore may be unnecessary as the material is cooled to ambient temperature. The material may be heated from ambient back to 875° C. isocompositionally by following these steps in reverse order.

The gas phase oxygen partial pressure as a function of temperature is a thermodynamic function of the mixed conducting metal oxide composition and may be determined by conventional means such as thermogravimetric analysis (TGA). The isocompositional curve of FIG. 1 is an example of such an experimentally determined relationship between $P_{O2}$ and temperature. A description of such a technique is given in an article entitled "Nonstoichiometry and Defect Structure of the Perovskite-Type Oxides $La_{1-x}Sr_xFeO_{3-\delta}$" by J. Mizusaki et. al., *J. Solid State Chemistry* 58, 257 (1985), which is incorporated herein by reference. Other techniques are equally applicable for this purpose such as, for example, coulometric titration. An example of this technique is disclosed in M. Lankhorst, Ph.D. Thesis, University of Twente, The Netherlands, 1997. In any of these techniques, the equilibrium oxygen partial pressure is measured as a function of temperature for a given oxygen stoichiometry of the mixed conducting metal oxide material to determine the isocompositional $P_{O2}$-temperature relation of FIG. 1. This isocompositional relation is a fundamental thermodynamic property of the material, and each composition will have a different isocompositional $P_{O2}$-temperature relationship. For a given mixed conducting metal oxide material composition (i.e., metal cation stoichiometry), each oxygen stoichiometry will have a different isocompositional $P_{O2}$-temperature relation.

Figure 2:
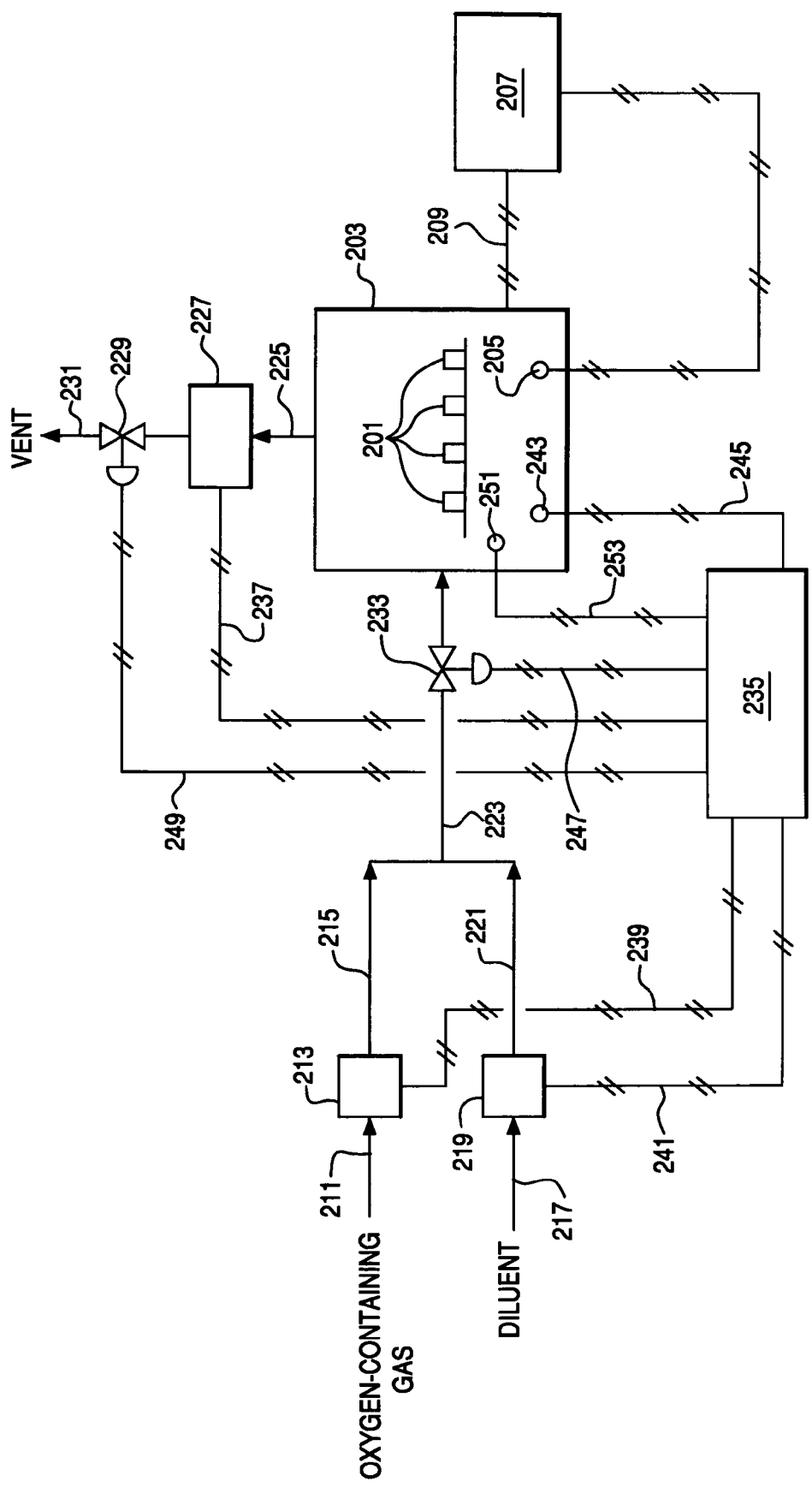
FIG. 2 is a schematic flow diagram of a system to control the oxygen partial pressure of the atmosphere in contact with an article comprising mixed conducting metal oxides during heating and cooling of the article.

In the manufacturing of articles made of ceramic materials, it is necessary to cool articles to ambient temperature after high-temperature sintering. The principles described above may be used to cool ceramic articles made of mixed conducting metal oxide materials isocompositionally from processing temperatures to ambient temperature. This may be effected in an exemplary apparatus illustrated in FIG. 2. Ceramic articles 201 may be processed in conventional process furnace or kiln 203, which may be an electrically-heated or gas-fired unit of any type known in the art. The furnace temperature may be controlled by a feedback control system comprising temperature sensor 205, controller 207, and feedback signal 209, and such a control system is typically part of the furnace system supplied by the vendor.

The atmosphere in furnace 203 may be controlled by introducing an oxygen-containing gas into the furnace and controlling the composition of the oxygen-containing gas during cooling. The oxygen partial pressure of the oxygen-containing gas may be controlled by introducing a diluent or diluent gas, wherein a diluent or diluent gas is defined as a gas containing no $O_2$ or containing $O_2$ at a lower concentration than that in the oxygen-containing gas. Alternatively, the oxygen-containing gas may comprise components selected from the group consisting of nitrogen, nitric oxide (NO), nitrous oxide ($N_2O$), carbon monoxide, carbon dioxide, water, or mixtures thereof. The diluent gas may comprise components selected from the group consisting of nitrogen, argon, helium, carbon dioxide, water, and mixtures thereof.

The oxygen-containing gas is provided in line 211 at a selected flow rate controlled by flow controller 213 and flows through line 215. Diluent gas is provided in line 217 at a selected flow rate controlled by flow controller 219 and flows through line 221. The oxygen-containing gas and diluent gases may be combined to provide an oxygen-containing gas that flows via line 223 into furnace 203. Vent gas flows from the furnace via line 225, passes through optional gas analyzer 227 and flow control or backpressure regulating valve 229, and may be vented to the atmosphere via line 231 or sent to a vent gas recovery system (not shown) if desired. The gas pressure in furnace 203 may be controlled by pressure control valve 233 and/or regulating valve 229.

In a typical embodiment, the oxygen-containing gas in line 211 is air and the diluent gas in line 217 is nitrogen. Alternatively, the oxygen-containing gas in line 211 can be oxygen or oxygen-enriched air and the diluent gas may be air, nitrogen-depleted air, or nitrogen. Other combinations of oxygen-containing gas and diluent gases are possible using the oxygen-containing gas and diluent gases listed above.

The flow rate, total pressure, and composition of the oxygen-containing gas supplied to the interior of furnace 203 may be controlled by any of several methods by control system 235. In one embodiment, a furnace atmosphere concentration may be selected and provided as a set point for controller 235, the composition of the furnace atmosphere measured by analyzer 227, and a signal proportional to the $O_2$ concentration in the furnace effluent relayed via signal line 237 to controller 235. The controller provides set point signals via signal lines 239 and 241 to mass or volumetric flow controllers 213 and 219, respectively, to control the flow rates of the oxygen-containing gas and diluent gas in lines 215 and 221, respectively. This composition may be constant with time, and alternatively or additionally may change with time in a predetermined time-composition profile or with temperature in a desired temperature-composition profile. Flow controllers 213 and 219 may be individual controllers, each of which has a sufficiently wide range of flow rates. Alternatively, flow controllers 213 and 219 each may comprise multiple control units, each of which covers a portion of the necessary overall range of flow rates.

The total pressure of the atmosphere in furnace 203 may be controlled at a constant value, and alternatively or additionally may be controlled to change with time in a predetermined pressure-time profile or with temperature in a desired pressure-temperature profile. To effect this control, the total pressure is measured by pressure transducer/transmitter 243 and transmitted via signal line 245 to controller 235. The controller regulates the pressure at the predetermined level or pressure-time profile by control signals via signal line 247 and/or signal line 249 to pressure control valve 233 and/or backpressure control valve 229, respectively.

Control system 235 may be programmed to control the oxygen partial pressure or oxygen activity within furnace 203 during heating or cooling according to any predetermined profile. In one embodiment, articles 201 comprising mixed conducting metal oxide material are made of appropriate green ceramic precursors fired in furnace 203 at a typical firing temperature of 1250° C. In order to cool the articles isocompositionally as described earlier (or as close to isocompositionally as possible), the isocompositional $P_{O2}$-temperature equilibrium relationship for the mixed conducting metal oxide material (similar to FIG. 1) is determined and programmed into controller 235. In this example, the initial atmosphere in the furnace at a typical temperature of 1250° C. is air supplied as the oxygen-containing gas via line 211 and flow controller 213.

In an alternate embodiment, the ceramic articles may be cooled from the firing temperature to a lower temperature at a constant $O_2$ partial pressure. The values of the lower temperature and the cooling rate are chosen such that the ceramic part will remain in chemical equilibrium, or substantially in chemical equilibrium, with the gas phase over the temperature range from the firing temperature to the lower temperature. Since the oxygen diffusivity is much faster at higher temperatures than at lower temperatures, it is possible to maintain the ceramic parts in chemical equilibrium with the gas phase as the ceramic articles are cooled at a constant oxygen partial pressure from the firing temperature to a given lower temperature. When the parts reach the given lower temperature, controller 235 then would begin to control the total pressure of the furnace or the gas composition of the furnace to a desired temperature-pressure or temperature-oxygen partial pressure profile to maintain the isocompositional oxygen stoichiometry.

The temperature in furnace 203 may be reduced at a predetermined rate (for example, 1° C. per minute) by furnace controller 207, the furnace temperature measured by temperature sensor 251, and a temperature signal transmitted via signal line 253 to controller 235. The temperature then may be compared with the stored isocompositional $P_{O2}$-temperature equilibrium relationship for the mixed conducting metal oxide material of articles 201 (e.g., FIG. 1). The appropriate $P_{O2}$ is determined and the controller sends the proper set points via signal lines 239 and 241 to flow controllers 213 and 219, respectively. The proper relative flows of air and nitrogen via lines 215 and 221, respectively, are blended and the mixed gas flows via line 223 and control valve 233 to furnace 203, so that the $P_{O2}$ is substantially in equilibrium with the stoichiometric composition of the mixed conducting metal oxide material in articles 201 at the measured temperature. The total pressure typically is maintained at a constant level by controller 235 via pressure control valve 233 and/or backpressure control valve 229. Control by properly decreasing $P_{O2}$ is continued in this manner as the temperature is reduced to about 100° C., below which control of $P_{O2}$ may not be necessary. Alternately, the $P_{O2}$ may become sufficiently low at a higher temperature, typically<$10^{-4}$ atm, that control of the $P_{O2}$ or further reduction in the $P_{O2}$ may not be necessary as the temperature is decreased further.

As an alternative to blending air and nitrogen over the entire cooling temperature range, when the gas pressure in furnace 203 is above atmospheric, the total pressure in the furnace may be reduced by controller 235 via pressure control valve 233 and/or backpressure control valve 229 as the temperature drops during cooling, thereby controlling $P_{O2}$ to maintain an isocompositional state in articles 201. This control of $P_{O2}$ via total pressure control will be effective down to a certain temperature, below which the gas composition may be controlled as described above for the remainder of the cooling.

In an alternative embodiment of the invention, the surface of the mixed conducting metal oxide material in articles or parts 201 may be placed in compression by maintaining the gas phase at an oxygen partial pressure that less than the equilibrium partial pressure at the gas temperature surrounding the article. The difference between the equilibrium oxygen partial pressure and the oxygen partial pressure set point to be used in this embodiment is first determined by setting the desired degree of surface compressive strain relative to the center of the thickest length scale part, for example 200 parts per million. Then, knowing the amount of strain produced for a given oxygen partial pressure difference at a given temperature for the composition of the ceramic article, the desired temperature-gas composition profile can be calculated and employed during the temperature transient. Intentionally placing the surface of the mixed conducting metal oxide material in compression may be advantageous because ceramics are generally much stronger in compression than in tension. This embodiment also would be advantageous for articles or parts with multiple dimensional scales since the features with the smallest dimensional scales would be placed in compression while the features with the longest dimensional scales would be in tension. However, since features with the largest dimensional scale are generally thicker, the stress levels in the portion in tension would be low.

Figure 3:
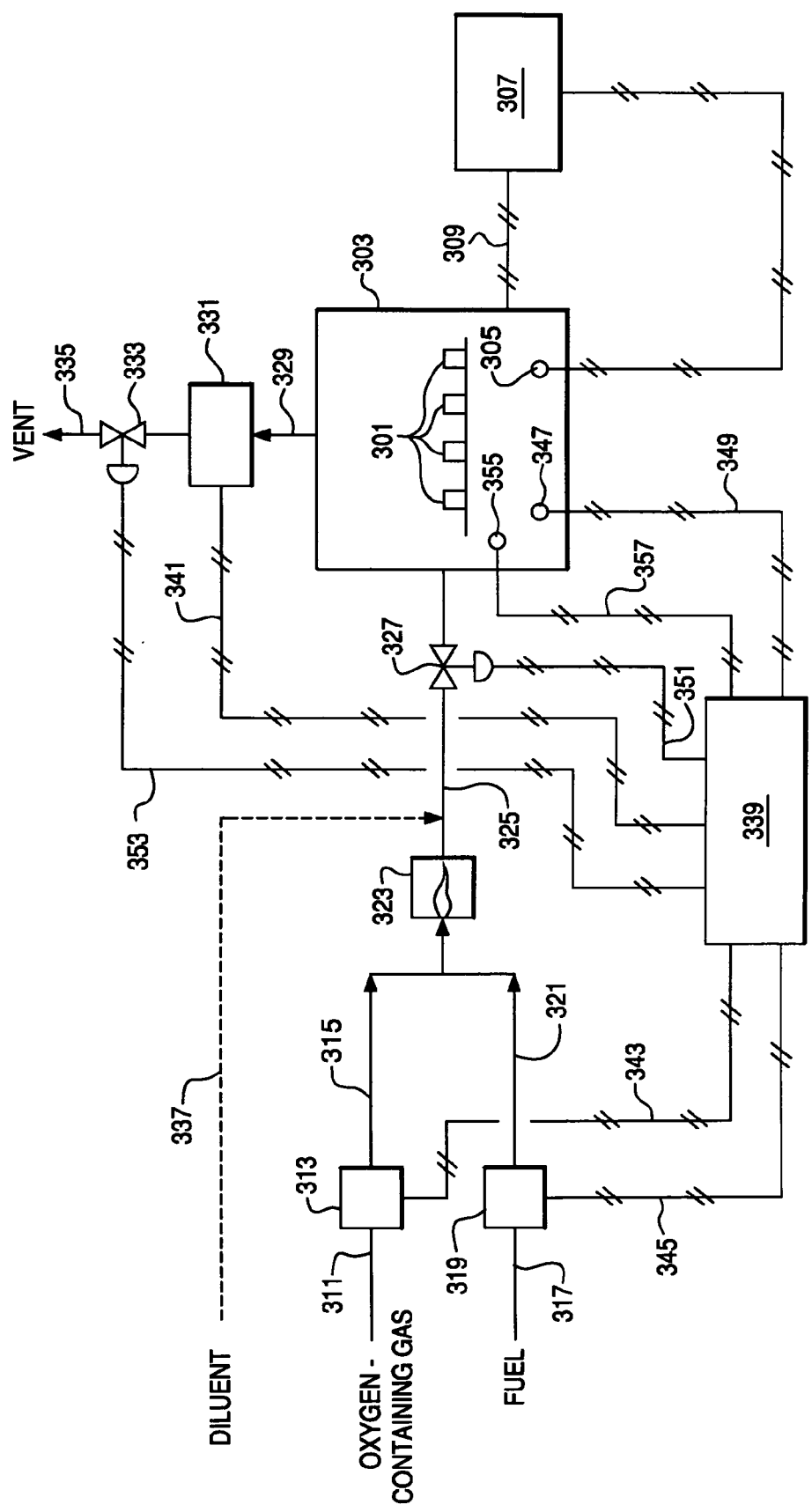
FIG. 3 is a schematic flow diagram of an alternative system to control the oxygen partial pressure of the atmosphere in contact with an article comprising mixed conducting metal oxides during heating and cooling of the article.

An alternative embodiment for the control of $P_{O2}$ is illustrated in FIG. 3. In this embodiment, $P_{O2}$ is controlled by combusting a fuel with an oxygen-containing gas such as air to form an oxygen-depleted combustion product which passes to the furnace and provides the atmosphere therein. Ceramic articles 301 are processed in conventional process furnace or kiln 303, which may be an electrically-heated or gas-fired unit of any type known in the art. The furnace temperature may be controlled by a feedback control system comprising temperature sensor 305, controller 307, and feedback signal 309; such a control system typically is part of the furnace system supplied by the vendor.

Oxygen-containing gas (for example, air) is provided in line 311 at a selected flow rate controlled by flow controller 313 and flows through line 315. Fuel gas is provided in line 317 at a selected flow rate controlled by flow controller 319 and flows through line 321. The oxygen-containing gas and fuel gases are combusted in burner 323 and the oxygen-depleted combustion products flow via line 325 and optional pressure control valve 327 into furnace 303. Flue gas flows from the furnace via line 329, passes through optional gas analyzer 331 and flow control or backpressure regulating valve 333, and may be vented to the atmosphere via line 335 or sent to a flue gas recovery system (not shown) if desired.

The gas pressure in furnace 303 may be controlled by control valves 327 and/or 333. The heat generated by burner 323 will supplement the independent furnace heating system, thereby requiring less heat input by this system. Optionally, a diluent gas may be introduced via line 337 if necessary.

The flow rate, total pressure, and composition of the oxygen-containing gas supplied to the interior of furnace 303 may be controlled by any of several methods by control system 339. In one embodiment, a furnace atmosphere concentration is selected and provided as a set point for controller 339, the composition of the furnace atmosphere is measured by analyzer 331, and a signal proportional to the composition of the oxygen-containing gas is relayed via signal line 341 to controller 339. The controller provides set point signals via signal lines 343 and 345 to mass or volumetric flow controllers 313 and 319, respectively, to control the flow rates of the oxygen-containing gas and fuel gas in lines 315 and 321, respectively. This composition may be constant with time and alternatively or additionally may change with time in a predetermined manner. Flow controllers 313 and 319 may be individual controllers, each of which has a sufficiently wide range of flow rates. Alternatively, flow controllers 313 and 319 each may comprise multiple control units, each of which covers a portion of the necessary overall range of flow rates.

The total pressure of the atmosphere in furnace 303 may be controlled at a constant value, and alternatively or additionally may be controlled to change with time in a predetermined pressure-time profile. To effect this control, the total pressure is measured by pressure transducer/transmitter 347 and transmitted via signal line 349 to controller 339. The controller regulates the pressure at the predetermined level or pressure-time profile by control signals via signal line 351 to pressure control valve 327 and/or signal line 353 to backpressure control valve 333, respectively.

Control system 339 may be programmed to control the oxygen partial pressure within furnace 303 during heating or cooling according to any predetermined profile. In one embodiment, articles 301 comprising mixed conducting metal oxide material are fabricated of appropriate green ceramic precursors and fired in furnace 303 at a typical firing temperature of 1250° C. In order to cool the articles isocompositionally as described earlier, the isocompositional $P_{O2}$-temperature equilibrium relationship for the mixed conducting metal oxide material (similar to FIG. 1) is determined and programmed into controller 339. In this example, the initial atmosphere in the furnace at a typical temperature of 1250° C. is air supplied as the oxygen-containing gas via line 311 and flow controller 313.

The temperature in furnace 303 may be reduced at a predetermined rate (for example, 1° C. per minute) by furnace controller 307 wherein the furnace temperature is measured by temperature sensor 305 and a temperature signal is transmitted to controller 307. The temperature also is measured by temperature sensor 355, via line 357, and compared with the stored isocompositional $P_{O2}$-temperature equilibrium relationship (e.g., FIG. 1), the appropriate $P_{O2}$ is determined, and the controller sends the proper set points via signal lines 343 and 345 to flow controllers 313 and 319, respectively. The relative flows of air and fuel via lines 315 and 321 to burner 323 and the total pressure in furnace 303 are controlled so that the $P_{O2}$ is substantially in equilibrium with the stoichiometric composition of the mixed conducting metal oxide material in articles 301 at the measured temperature. The total pressure in the furnace may be maintained at a constant level by controller 339 via pressure control valve 327 and/or backpressure control valve 333. Control by properly decreasing $P_{O2}$ is continued in this manner as the temperature is reduced to about 100° C., below which control of $P_{O2}$ may not be necessary.

As an alternative to or in addition to combusting air and fuel over the entire cooling temperature range, when the gas pressure in furnace 303 is above atmospheric pressure, the total pressure in the furnace may be reduced by controller 339 via pressure control valve 327 and/or backpressure control valve 335 as the temperature drops during cooling, thereby controlling $P_{O2}$ to maintain an isocompositional state in articles 301. This control of $P_{O2}$ via total pressure control will be effective down to a certain temperature, below which the gas composition must be controlled as described above for the remainder of the cooling.

In an alternative embodiment similar to that described above with reference to FIG. 2, the surface of the mixed conducting metal oxide material in articles or parts of membrane module 301 of FIG. 3 may be placed in compression by maintaining the gas phase at an oxygen partial pressure that is less than the equilibrium partial pressure at the gas temperature surrounding the article. Intentionally placing the surface of the mixed conducting metal oxide material in compression may be advantageous because ceramics are generally much stronger in compression than in tension. This embodiment also would be advantageous for articles that have multiple dimensional scales since the features with the smallest dimensional scales would be placed in compression while the features with the longest dimensional scales would be in tension. However, since features with the largest dimensional scale are generally thicker, the stress levels in the portion in tension would be low.

The embodiments of the invention described above are useful in the cooling of articles made of mixed conducting metal oxide ceramic materials from sintering temperatures to ambient temperatures during the manufacturing process. Additional embodiments of this invention may be applied during the heating and/or cooling of process apparatus comprising mixed conducting metal oxide materials. For example, the methods of controlling $P_{O2}$ described above may be applied to the heating and cooling of ceramic membrane gas separation modules and membrane reactor modules during startup, shutdown, and other transient temperature conditions.

Figure 4:
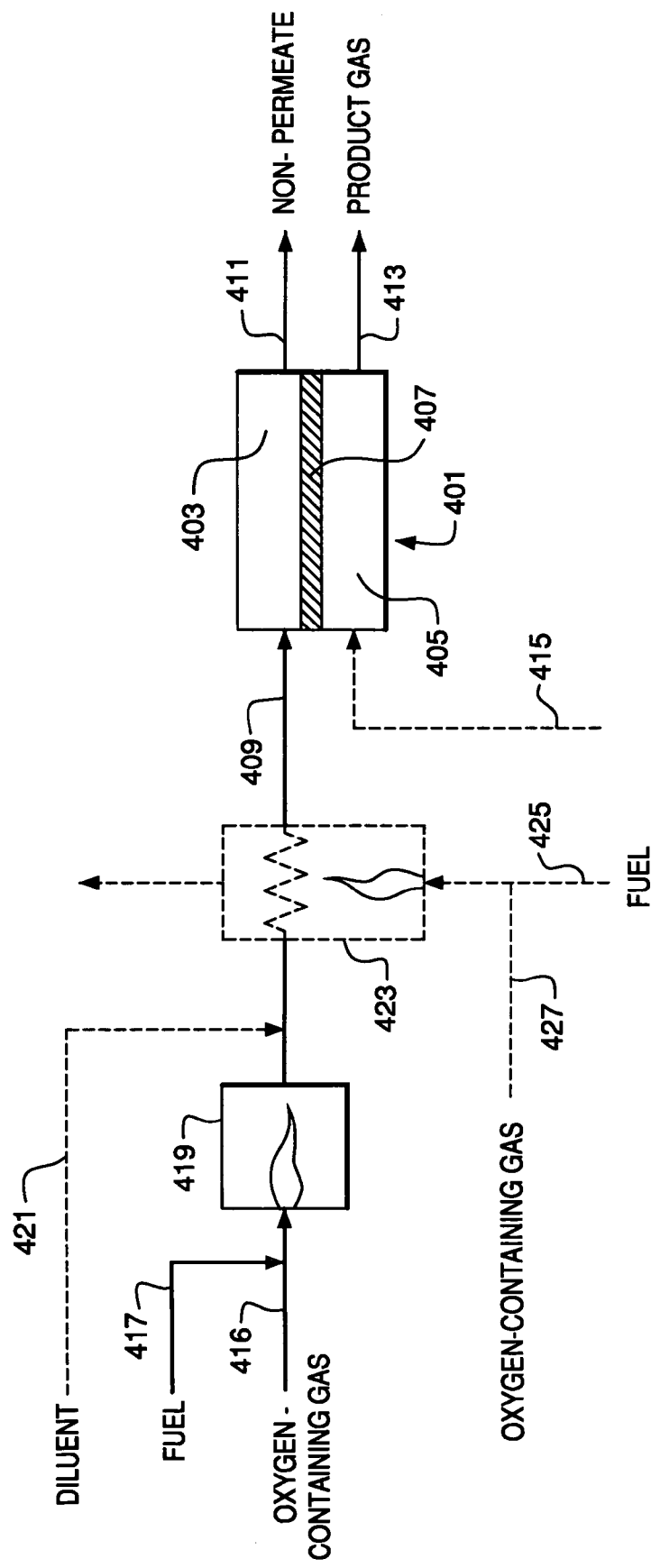
FIG. 4 is a schematic flow diagram of a system to control the oxygen partial pressure of the atmosphere in contact with an ion transport membrane module comprising mixed conducting metal oxides.

This embodiment is illustrated in FIG. 4, which is a schematic flow diagram of a membrane oxygen separation system or a membrane reactor system that utilizes mixed conducting metal oxide membranes. Membrane module 401 is a simplified schematic depiction of a membrane module which comprises oxygen-containing gas feed side 403 and product or permeate side 405 separated by mixed conducting metal oxide membrane 407. Any module configuration or design may be used in this embodiment as long as the membrane comprises a mixed conducting metal oxide material.

Hot oxygen-containing gas in line 409 is introduced into oxygen-containing gas feed side 403 of the module, oxygen permeates membrane 407, and $O_2$-depleted non-permeate gas exits via line 411. In one embodiment, membrane module 401 may be operated as an oxygen recovery device wherein high purity oxygen collects in product or permeate side 405 of the module and is withdrawn via product line 413. Optional sweep gas may be introduced via line 415. In another embodiment, membrane module 401 may be operated as a membrane reactor in which a reactant gas (for example, a methane-containing gas such as natural gas or a prereformed natural gas/steam/synthesis gas mixture) is introduced via line 415 into membrane module 401. The reactant gas reacts with permeated oxygen in product or reactant side 405 to form a reactant product (for example, synthesis gas) which is withdrawn via line 413.

Membrane module 401 typically operates in the temperature range of 650 to 1000° C. and may be heated and maintained at temperature by heating oxygen-containing gas in line 409 in an upstream heating system. In the illustration of FIG. 4, an oxygen-containing gas (for example, air) via line 416 and a fuel (for example, natural gas) via line 417 are combusted in burner 419 to provide the hot oxygen-containing gas in line 409 that is introduced into membrane module 401. Optionally, a diluent (for example, nitrogen or a portion of the $O_2$-depleted non-permeate from line 411) may be introduced via line 421 and/or line 415. Alternatively, an oxygen-rich gas (i.e., a gas containing a higher oxygen concentration than the $O_2$-containing gas in line 409) may be introduced via line 421 and/or line 415. Optionally, indirectly-fired burner or process furnace 423, which is fired by a fuel (for example, natural gas) via line 425 and an oxygen-containing gas (for example, air) via line 427, may be used to further heat the hot oxygen-containing gas from burner 419 without changing the oxygen partial pressure of this gas.

During startup of membrane module 401, the module is heated from ambient temperature to the operating temperature of 650° C. to 1000° C. and during shutdown the module is cooled from this operating temperature to ambient temperature. During the temperature changes accompanying startup and shutdown, it is desirable to control the oxygen partial pressure ($P_{O2}$) in oxygen-containing gas side 403 of membrane module 401 such that the $P_{O2}$ is substantially in chemical equilibrium, or as close as possible to chemical equilibrium, with the stoichiometric composition of the mixed conducting metal oxide material in membrane 407 over the temperature range of the heating and/or cooling. This may be accomplished by increasing the $P_{O2}$ of the hot oxygen-containing gas in line 409 so that the value of $P_{O2}$ falls on (or as close as possible to) the isocompositional equilibrium line of FIG. 1 as the membrane module is heated and decreasing the $P_{O2}$ of the hot oxygen-containing gas in line 409 so that the value of $P_{O2}$ falls on (or as close as possible to) the isocompositional equilibrium line of FIG. 1 as the membrane module is cooled.

In another embodiment, the $P_{O2}$ on product side 405 also may be controlled to minimize deviation of that face of membrane 407 from the isocompositional curve of FIG. 1. This may be accomplished by introducing gas of controlled composition to module 401 via line 415. The composition of this gas would be chosen such that the gas-phase composition is substantially in chemical equilibrium with the oxygen stoichiometry of the membrane 407. The flow rate of the gas may be chosen to provide sufficient time for the gas-phase composition to change relative to changes in the required equilibrium composition of the gas phase as the temperature changes.

In an alternative embodiment, this technique may be used to control the total pressure on product side 405 as the temperature is changed. For example, at low temperature, the total pressure inside the module may be set to a low value by withdrawing gas through line 413. As the temperature increases, an oxygen-containing gas such as oxygen may be introduced into the module via line 415 to increase the oxygen partial pressure inside the module. During shutdown, the temperature of membrane module 401 is reduced from the operating temperature to ambient temperature. The control of $P_{O2}$ as the module cools may be accomplished in a manner similar to that described above except that during cooling the $P_{O2}$ is decreased to maintain the membrane material as close to the isocompositional line of FIG. 1 as possible.

During steady operation of membrane module 401, a gradient in oxygen partial pressure or oxygen activity typically will exist across membrane 407. Each face of membrane 407 will have a different oxygen stoichiometry. In another embodiment, the $P_{O2}$ or the oxygen activity in oxygen-containing gas side 403 and in the gas in the product side 405 of membrane module 401 may be independently controlled to minimize deviation of each face of membrane 407 from the isocompositional curve of FIG. 1. This may be accomplished by introducing gas of controlled composition to module 401 via line 415 and another gas of controlled composition to module 401 via line 409. The composition of each gas would be chosen so that the gas-phase composition in oxygen-containing gas side 403 is substantially in chemical equilibrium with the oxygen stoichiometry of the membrane 407 on the face of the membrane facing gas side 403 and so that the gas-phase composition in the product side 405 is substantially in chemical equilibrium with the oxygen stoichiometry of the membrane 407 on the face of the membrane facing gas side 405. In this way, the gradient in oxygen stoichiometry may be maintained as the part is cooled or heated. The flow rate of each gas may be chosen to provide sufficient time for the gas-phase composition to change relative to changes in the required equilibrium composition of the gas phase as the temperature changes.

Alternatively, it may be desirable to maintain the surface of the mixed conducting metal oxide material in the membrane module in compression by maintaining the gas phase in oxygen-containing gas feed side 403 of membrane module 401 at an oxygen partial pressure that is less than the equilibrium partial pressure at the gas temperature in oxygen-containing gas feed side 403. Intentionally placing the surface of the mixed conducting metal oxide material in compression may be advantageous because ceramics are generally much stronger in compression than in tension. This embodiment also would be advantageous for membrane module parts with multiple dimensional scales since the features with the smallest dimensional scales would be placed in compression while the features with the longest dimensional scales would be in tension. However, since features with the largest dimensional scale are generally thicker, the stress levels in the portion in tension would be low.

The control of the $P_{O2}$ of hot oxygen-containing gas in line 409 in the above embodiments may be accomplished by appropriate regulation of any or all of the parameters (1) air/fuel ratio in burner 419, (2) firing rate of burner 419, (3) flow rate of optional diluent gas or oxygen-containing gas in line 421, and (4) firing rate of optional indirectly-fired burner or process furnace 423. Additionally or in combination with these parameters, the control of $P_{O2}$ may be effected by controlling the total pressure in oxygen-containing gas feed side 403 of membrane module 401 by appropriate means.

In one possible startup scenario during the heating of membrane module 401 at temperatures above about 100° C., it is desirable to increase $P_{O2}$ as temperature increases as guided by FIG. 1. This may be accomplished, for example, by operating burner 419 at a selected fixed air/fuel ratio and initially at a low firing rate, introducing diluent gas or oxygen-containing gas at an initial rate to achieve the desired $P_{O2}$, and adding supplemental heat as needed by indirect burner 423. As the temperature in membrane module 401 increases, $P_{O2}$ may be increased by changing the flow of diluent gas or oxygen-containing gas via line 421. The firing rate of burner 419 may be increased and the firing rate of burner 423 may be decreased as the final temperature of membrane module approaches the desired operating temperature. When the membrane module reaches the operating temperature, the flow of diluent gas and operation of burner 423 may be terminated and the system operated with burner 419 operating at the selected air/fuel ratio and supplying all process heating for the system.

Other alternative startup methods are possible and may be devised readily by skilled process engineers and operators using the controllable parameters described above. For example, it may be desirable to fire burner 419 initially at a low air/fuel ratio to provide a lower $P_{O2}$ and then gradually increase the air/fuel ratio to increase $P_{O2}$ as the temperature of membrane module 401 increases. As the membrane module 401 approaches the operating temperature, the firing rate of burner 419 may be decreased and the firing rate of burner 423 may be increased to maintain temperature and a high oxygen partial pressure.

In the embodiment described above with reference to FIG. 4, a single membrane module 401 was used to illustrate embodiments of the invention. The operation of larger commercial-scale membrane oxygen separation systems or membrane reactor systems may require multiple membrane modules operated in series. When membrane modules are operated in series at steady state, a temperature profile and/or a $P_{O2}$ profile may occur in the axial or flow direction over the series of modules; these profiles will be different in gas separation systems and oxidation reactor systems. When a series of membrane modules is started up or shut down, the control of $P_{O2}$ on the feed side of the membrane modules will be more difficult than in a single module because of the axial temperature and/or axial $P_{O2}$ profiles.

Figure 5:
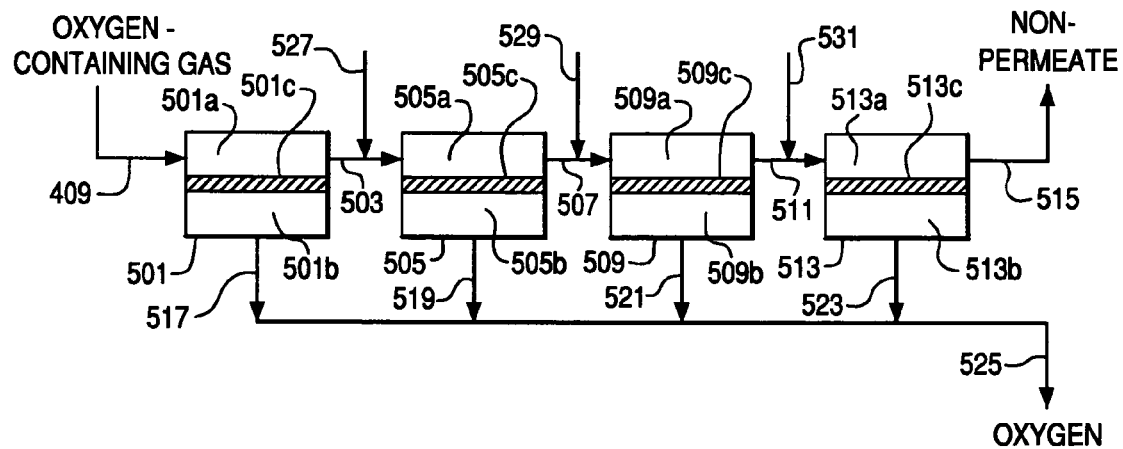
FIG. 5 is a schematic flow diagram of a system to control the oxygen partial pressure of the atmosphere in contact with a series of ion transport membrane modules for the separation of oxygen wherein the membrane modules comprise mixed conducting metal oxides.

Another embodiment of the invention may be utilized to control $P_{O2}$ in series operation of membrane modules wherein different values of $P_{O2}$ are controlled at different axial locations along the series of modules. This is illustrated in FIG. 5, which is a schematic flow diagram of a membrane oxygen separation system that utilizes four mixed conducting metal oxide membrane modules in series. The terms "series" and "series operation" as used herein means that a process stream leaving any module flows into the next module in the series of modules. In this embodiment, an oxygen-containing gas leaving one module provides the oxygen-containing gas flowing to the next module.

In steady-state operation, preheated oxygen-containing gas (for example, air) may be provided via line 409 from the preheating system of FIG. 4 to membrane module 501, which is shown schematically to include oxygen-containing feed side 501a, permeate side 501b, and membrane 501c. Oxygen permeates membrane 501c and partially $O_2$-depleted gas flows via line 503 to membrane module 505, which is shown schematically to include oxygen-containing gas feed side 505a, permeate side 505b, and membrane 505c.

Oxygen permeates membrane 505c and further $O_2$-depleted gas flows via line 507 to membrane module 509 which is shown schematically to include oxygen-containing gas feed side 509a, permeate side 509b, and membrane 509c. Oxygen permeates membrane 509c and further oxygen-depleted gas flows via line 511 to membrane module 513 which is shown schematically to include oxygen-containing gas feed side 513a, permeate side 513b, and membrane 513c. Oxygen permeates membrane 513c and final $O_2$-depleted gas is withdrawn via line 515. Permeated oxygen product from the four modules flows via lines 517, 519, 521, and 523 and is withdrawn via manifold 525. Any module configuration or design may be used in this embodiment as long as the membrane comprises a mixed conducting metal oxide material.

During startup, $P_{O2}$ must be controlled in each of the modules 501, 505, 509, and 513 and this may not be possible if $P_{O2}$ is controlled only in the oxygen-containing gas feed in line 409. During heating, a temperature profile may exist in the axial direction (i.e., the flow direction from the inlet of module 501 to the outlet of module 513). Depending on the membrane composition, oxygen permeation may start to be significant at a temperature as low as 400° C. If the oxygen partial pressure is not controlled on both sides of the membranes 501c, 505c, 509c, and 513c, oxygen may permeate from one side of the membrane to the other. If this occurs, the $P_{O2}$ will be different in the oxygen-containing feed gas side of each module.

In order to control the $P_{O2}$ properly in the oxygen-containing gas feed sides of each module 501, 505, 509, and 513 to minimize deviation from the isocompositional curve of FIG. 1, gas of controlled composition may be introduced to the oxygen containing feed side of each module via lines 409, 527, 529, and 531. The composition of the gas would be chosen such that the gas phase composition is substantially in chemical equilibrium with the oxygen stoichiometry of each module. The flow rate of the gas would be chosen to provide sufficient time for the gas phase composition to equilibrate relative to the changing gas-phase temperature.

In order to control the $P_{O2}$ properly on the permeate sides of the membrane modules 501, 505, 509 and 513 to minimize deviation from the isocompositional curve of FIG. 1, gas of controlled composition may be introduced into each module via lines 517, 519, 521 and 523. The composition of the gas would be chosen such that the gas phase composition is substantially in chemical equilibrium with the oxygen stoichiometry of the membrane. The flow rate of the gas would be chosen to provide sufficient time for the gas phase composition to equilibrate relative to the changing gas-phase temperature.

An alternative embodiment of this technique would control the total pressure on the permeate side of each module as the temperature is changed. For example, while cooling from the operating temperature, the total pressure inside the modules may be decreased by withdrawing gas through line 525 to maintain the oxygen partial pressure in equilibrium with the oxygen stoichiometry of the membrane modules. During a transient when the temperature increases, an oxygen-containing gas such as oxygen may be introduced into each module via lines 517, 519, 521 and 523 to increase the oxygen partial pressure inside each module.

During steady state operation of the system in FIG. 5, axial temperature and/or $P_{O2}$ profiles may exist, that is, the temperatures and/or the stoichiometric compositions of the membranes may differ in the axial or flow direction from module 501 to module 513. When the system is shut down, cooling will begin with these profiles and $P_{O2}$ must be controlled separately in each module during at least part of the cooling period.

In order to control $P_{O2}$ properly in each module 501, 505, 509, and 513 to minimize deviation from the isocompositional curve of FIG. 1, gas of controlled composition may be introduced to the oxygen containing feed side of each module via lines 409, 527, 529, and 531. The composition of the gas would be chosen such that the gas phase composition is substantially in chemical equilibrium with the oxygen stoichiometry of each module. The flow rate of the gas would be chosen to provide sufficient time for the gas phase composition to equilibrate relative to the changing gas-phase temperature.

In order to control the $P_{O2}$ properly on the interior of the membrane modules 501, 505, 509 and 513 to minimize deviation from the isocompositional curve of FIG. 1, gas of controlled composition may be introduced into each module via lines 517, 519, 521 and 523. The composition of the gas would be chosen such that the gas phase composition is substantially in chemical equilibrium with the oxygen stoichiometry of the membrane. The flow rate of the gas would be chosen to provide sufficient time for the gas phase composition to equilibrate relative to the changing gas-phase temperature. The composition of the gases in the oxygen-containing feed side and the permeate side of each membrane may be independently controlled to maintain an oxygen stoichiometry gradient across the membrane as the module is cooled or heated. This gradient may be the same oxygen stoichiometry gradient that exists across the membrane during steady state operation at the operating temperature.

An alternative embodiment of this technique would control the total pressure inside each module as the temperature is changed. For example, at steady state operating temperature, the total pressure inside the modules is set to the desired value by withdrawing gas through line 525. As the system is shut down and the temperature decreased, the total pressure would be decreased via line 525 to decrease the oxygen partial pressure inside each module.

Figure 6:
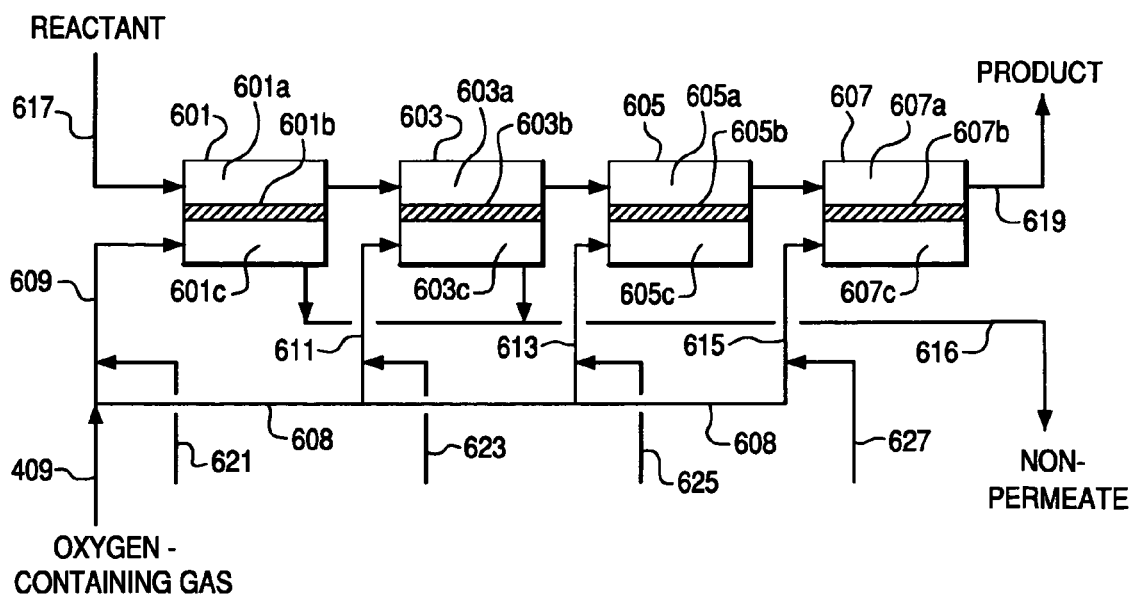
FIG. 6 is a schematic flow diagram of a system to control the oxygen partial pressure of the atmosphere in contact with a series of ion transport membrane reactor modules wherein the membrane modules comprise mixed conducting metal oxides.

Series membrane modules also may be operated in a membrane reactor system wherein a reactant gas is reacted with permeated oxygen to form selected oxidation products. This is illustrated in FIG. 6 in which four membrane reactor modules 601, 603, 605, and 607 are operated in series. The modules comprise, respectively, reactant sides 601a, 603a, 605a, and 607a, membranes 601b, 603b, 605b, and 607b, and oxygen-containing gas feed sides 601c, 603c, 605c, and 607c. Any module configuration or design may be used in this embodiment as long as the membrane comprises a mixed conducting metal oxide material. A heated oxygen-containing gas (for example, air) is introduced to the system via inlet line 409, manifold 608, and individual feed lines 609, 611, 613, and 615 into oxygen-containing gas feed sides 601c, 603c, 605c, and 607c, respectively. This heated oxygen-containing gas may be provided by the preheating system described earlier with reference to FIG. 4. $O_2$-depleted non-permeate gas is withdrawn from each module via manifold 616.

Preheated reactant gas (for example, a methane-containing gas such as natural gas or a preformed natural gas/steam/synthesis gas mixture) is introduced via line 617 and flows in series through the reactant sides of modules 601, 603, 605, and 607 while reacting therein with oxygen that has permeated through membranes 601b, 603b, 605b, and 607b, respectively. Reaction product gas (for example, synthesis gas comprising hydrogen and carbon monoxide) is withdrawn from the system via line 619. During steady-state operating conditions, the temperature and/or the stoichiometric composition of the membranes may differ in the axial or flow direction from module 601 to module 607. When the system is shut down, cooling will begin with these profiles and $P_{O2}$ must be controlled separately in each module during at least part of the cooling period.

The terms "series" and "series operation" as used herein means that a process stream leaving any module flows into the next module in the series of modules. In this embodiment, the reactant gas leaving one module provides the reactant gas flowing to the next module.

The heated oxygen-containing gas, typically air, enters via line 409 and flows to the modules as described above. The oxygen partial pressure in the oxygen-containing gas to each module may be controlled during heating or cooling of modules 601, 603, 605, and 607 by introducing additional gas via lines 621, 623, 625, and 627, respectively. When the modules are cooled, for example during system shutdown, the oxygen partial pressure in oxygen-containing feed gas sides 601c, 603c, 605c, and 670c may be reduced by introducing a diluent gas via lines 621, 623, 625, and 627, respectively. When the modules are heated, for example during system startup, the oxygen partial pressure in oxygen-containing feed gas sides 601c, 603c, 605c, and 670c may be increased by introducing an $O_2$-enriched gas via lines 621, 623, 625, and 627, respectively.

Alternatively, during system startup, the oxygen partial pressure in oxygen-containing feed gas sides 601c, 603c, 605c, and 607c may be controlled by blending an oxygen-containing gas such as air from line 409 with a diluent gas via lines 621, 623, 625, and 627, respectively. The total pressure of the oxygen-containing gas in oxygen-containing feed gas sides 601c, 603c, 605c, and 607c may be controlled by known means as necessary during heating, steady state operation, and cooling of the module system.

The following Examples illustrate embodiments of the present invention but do not limit the invention to any of the specific details described therein.

EXAMPLE 1

Preparation of Test Samples

Dense bars were prepared by uniaxially pressing powder of $La_{0.4}Sr_{0.6}CoO_{3-\delta}$, sintering at 1250° C. for 4 hours, and cooling to room temperature. The bars were machined to dimensions of 4 mm wide by 2.2 mm thick and 51.3 mm long. The bars then were annealed in air to remove any surfaces stresses caused by machining by heating to 1100° C. at 1° C./min, cooling to 600° C. at 1° C./min, and cooling to room temperature at 0.5° C./min.

EXAMPLE 2

Cooling in Air

Six bars prepared in the manner of Example 1 were heated in air at 2° C./min to 850° C., and cooled at 1° C./min to ambient temperature. The oxygen partial pressure was maintained at 0.209 atm by flowing a small amount of air into the furnace. After cooling to room temperature, the flexural strength of the bars was measured at room temperature in a four point bending apparatus. Exemplary techniques for conducting this testing can be found in ASTM C1161-94. The average strength of the 6 bars was 39.8 MPa with a standard deviation of 12.6 MPa.

EXAMPLE 3

Isocompositional Cooling

Six bars prepared in the manner of Example 1 were heated inside a retort in air at 2° C./min to 850° C., and cooled 1° C./min to room temperature while controlling the oxygen partial pressure in the retort. For the temperature range of 850° C. to 600° C., the oxygen partial pressure was maintained at 0.209 atm by flowing a small amount of air into the retort. For the temperature range of 600° C. to room temperature, the oxygen partial pressure inside the retort was controlled to maintain a constant oxygen stoichiometry in the ceramic bars. The variation of oxygen partial pressure as a function of temperature, to maintain a constant equilibrium vacancy concentration, $x_v(T^*,0.21)$, is given in the equation below:

$$\ln(P_{O_2}) = \frac{E_{O_x} - \frac{4}{g(\varepsilon_t)}(6x_v(T^*, 0.21) - x) - TS_{O_x} - 2RT\ln\left(\frac{x_v(T^*, 0.21)}{1 - x_v(T^*, 0.21)}\right) - \mu^0_{O_2}(T)}{RT}$$

where $x_v(T^*,0.21)$ represents the isocompositional oxygen vacancy concentration to be held constant at isocompositional temperature, $T^*$, and $P_{O_2}$ of 0.21 atm. In this case $T^*$ is 600° C. The chemical potential of oxygen, $\mu^0_{O_2}$, is given by:

$$\mu^0_{O_2}(T) = RT\left[-1.225 - \frac{1045}{T} - 3.5\ln(T) + 1.013\ln\left\{1 - \exp\left(\frac{-2242}{T}\right)\right\}\right]$$

where T is the absolute temperature and R is the ideal gas constant. The parameters $E_{O_x}$, $4/g(\epsilon_f)$, x, and $S_{O_x}$ are given in Table 1 below.

TABLE 1

Oxygen Non-stoichiometry Model Parameters.

| Parameter | Value | Units |
|---|---|---|
| $Eo_x$ | −201283 | J/mol |
| $1/g(\epsilon_f)$ | 44684 | J/mol |
| x | 0.6 | |
| $So_x$ | 139.6 | J/(mol K) |

The oxygen partial pressure was varied by blending nitrogen with air to achieve the desired oxygen partial pressure given by the equations above at a given temperature. At low temperatures, the desired oxygen partial pressure was lower than $10^{-5}$ atm. When the set point for the oxygen partial pressure went below $10^{-5}$ atm, the air was turned off entirely and only nitrogen was fed to the retort.

After cooling to room temperature, the flexural strength at room temperature of the bars was measured in a four point bending apparatus. Exemplary techniques for conducting this testing can be found in ASTM C1161-94. The average strength of the 6 bars was 66.0 MPa with a standard deviation of 5.9 MPa. Therefore, employing the isocompositional cooling method improved the strength of the ceramic bars considerably when compared to the bars of Example 1 which were cooled at a constant oxygen partial pressure.

The invention claimed is:

1. A method for processing an article comprising a mixed conducting metal oxide material, which method comprises
    (a) contacting the article with an oxygen-containing gas and reducing or increasing the temperature of the oxygen-containing gas;
    (b) when the temperature of the oxygen-containing gas is reduced, reducing the oxygen activity in the oxygen-containing gas; and
    (c) when the temperature of the oxygen-containing gas is increased, increasing the oxygen activity in the oxygen-containing gas.

2. The method of claim 1 wherein the article has a stoichiometric composition, the article is cooled, and the oxygen activity in the oxygen-containing gas is reduced while cooling so that the oxygen activity is substantially in chemical equilibrium with the stoichiometric composition of the mixed conducting metal oxide material during at least a portion of the cooling.

3. The method of claim 1 wherein the article has a stoichiometric composition, the article is heated, and the oxygen activity in the oxygen-containing gas is increased during heating so that the oxygen activity is substantially in chemical equilibrium with the stoichiometric composition of the mixed conducting metal oxide material during at least a portion of the heating.

4. The method of claim 1 wherein the oxygen-containing gas comprises a diluent and wherein the oxygen activity in the oxygen-containing gas is changed by changing concentration of the diluent therein.

5. The method of claim 1 wherein the oxygen activity in the oxygen-containing gas is changed by changing the total pressure of the oxygen-containing gas.

6. The method of claim 1 wherein the oxygen-containing gas comprises one or more components selected from the group consisting of oxygen, nitrogen, nitric oxide, nitrous oxide, carbon monoxide, carbon dioxide, and water.

7. The method of claim 4 wherein the diluent comprises one or more components selected from the group consisting of nitrogen, argon, helium, water, and carbon dioxide.

8. The method of claim 4 wherein the oxygen-containing gas comprises dioxygen ($O_2$) and nitrogen.

9. A method for processing an article comprising a mixed conducting metal oxide material, which method comprises
    (a) contacting the article with an oxygen-containing gas comprising dioxygen ($O_2$) and reducing or increasing the temperature of the oxygen-containing gas;
    (b) when the temperature of the oxygen-containing gas is reduced, reducing the oxygen partial pressure in the oxygen-containing gas; and
    (c) when the temperature of the oxygen-containing gas is increased, increasing the oxygen partial pressure in the oxygen-containing gas.

10. The method of claim 9 wherein the article has a stoichiometric composition, the article is cooled, and the oxygen partial pressure in the oxygen-containing gas is reduced while cooling so that the oxygen partial pressure is substantially in chemical equilibrium with the stoichiometric composition of the mixed conducting metal oxide material during at least a portion of the cooling.

11. The method of claim 9 wherein the article has a stoichiometric composition, the article is heated, and the oxygen partial pressure in the oxygen-containing gas is increased during heating so that the oxygen partial pressure is substantially in chemical equilibrium with the stoichiometric composition of the mixed conducting metal oxide material during at least a portion of the heating.

12. The method of claim 9 wherein the oxygen-containing gas comprises a diluent and wherein the oxygen partial pressure in the oxygen-containing gas is changed by changing the concentration of the diluent therein.

13. The method of claim 9 wherein the oxygen partial pressure in the oxygen-containing gas is changed by changing the total pressure of the oxygen-containing gas.

14. The method of claim 12 wherein the diluent is selected from the group consisting of nitrogen, argon, helium, carbon dioxide, water, and mixtures thereof.

15. The method of claim 9 wherein the oxygen-containing gas is a mixture formed by the combustion of an oxidant gas containing dioxygen ($O_2$) and a fuel and further wherein the oxygen partial pressure in the oxygen-containing gas is changed by changing the relative amounts of the oxidant gas and the fuel prior to combustion.

16. The method of claim 15 wherein the oxidant gas is air and the fuel comprises methane.

17. A method for heating or cooling an article comprising a mixed conducting metal oxide material having a stoichiometric composition, which method comprises
    (a) contacting the article with an oxygen-containing gas while changing the temperature of the article; and
    (b) at any temperature while changing the temperature of the article, maintaining the oxygen activity in the oxygen-containing gas at a value that is less than the oxygen activity in the oxygen-containing gas that would be in chemical equilibrium with the stoichiometric composition of the mixed conducting metal oxide material in the article at the same temperature.

18. A method of operating an ion transport membrane system comprising
    (a) providing at least one membrane module comprising a membrane made of mixed conducting metal oxide material;
    (b) contacting the membrane with a heated oxygen-containing gas comprising dioxygen ($O_2$) while the temperature of the membrane is reduced or increased;
    (c) when the temperature of the membrane is reduced, reducing the oxygen partial pressure in the oxygen-containing gas; and
    (d) when the temperature of the membrane is increased, increasing the oxygen partial pressure in the oxygen-containing gas.

19. The method of claim 18 wherein the membrane has a stoichiometric composition, the membrane is cooled, and the oxygen partial pressure in the oxygen-containing gas is reduced while cooling the membrane so that the oxygen partial pressure is substantially in chemical equilibrium with the stoichiometric composition of the membrane during at least a portion of the cooling.

20. The method of claim 18 wherein the membrane has a stoichiometric composition, the membrane is heated, and the oxygen partial pressure in the oxygen-containing gas is increased while heating the membrane so that the oxygen partial pressure is substantially in chemical equilibrium with the stoichiometric composition of the membrane during at least a portion of the heating.

21. The method of claim 18 wherein the oxygen partial pressure in the oxygen-containing gas in contact with the membrane is changed by mixing a diluent gas with the oxygen-containing gas.

22. The method of claim 18 wherein the oxygen partial in the oxygen-containing gas in contact with the membrane is changed by changing the total pressure of the oxygen-containing gas.

23. The method of claim 18 wherein the heated oxygen-containing gas is provided by the direct combustion of an oxidant gas comprising dioxygen ($O_2$) with a fuel.

24. A method of operating an ion transport membrane system comprising
    (a) providing two or more membrane modules operating in series, each module comprising a membrane made of mixed conducting metal oxide material;
    (b) contacting each membrane with a heated oxygen-containing gas comprising dioxygen ($O_2$) while reducing the temperature of each membrane or increasing the temperature of each membrane;
    (c) when the temperature of each membrane is reduced, reducing the oxygen partial pressure in the oxygen-containing gas in each membrane module such that the oxygen partial pressure in the oxygen-containing gas in one of the membrane modules is different than the oxygen partial pressure in the oxygen-containing gas in another of the membrane modules; and
    (d) when the temperature of each membrane is increased, increasing the oxygen partial pressure in the oxygen-containing gas in each membrane module such that the oxygen partial pressure in the oxygen-containing gas in one of the membrane modules is different than the oxygen partial pressure in the oxygen-containing gas in another of the membrane modules.

25. An ion transport membrane system comprising
    (a) at least one membrane module having a membrane comprising mixed conducting metal oxide material;
    (b) means for contacting the membrane with a heated oxygen-containing gas and means for reducing or increasing the temperature of the membrane;
    (c) means for reducing the oxygen partial pressure in the oxygen-containing gas when the temperature of the membrane is reduced; and
    (d) means for increasing the oxygen partial pressure in the oxygen oxygen-containing gas when the temperature of the membrane is increased.

26. The system of claim 25 wherein the mixed conducting metal oxide material has the general stoichiometric composition $(Ln_{1-x}A_x)_w(B_{1-y}B'_y)O_{3-\square}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Go, Ni, Cu, Cr, Al, Zr and Ga; wherein $0 \leq x \leq 1$, $0 \leq y \leq 1$, and $0.95 < w < 1.05$; and wherein $\square$ is a number that renders the compound charge neutral.

27. The system of claim 26 wherein the mixed conducting metal oxide material has the general stoichiometric composition $(La_xCa_{1-x})_w FeO_{3-\delta}$ wherein $1.0 > x > 0.5$, $1.1 \geq w \geq 1.0$, and $\delta$ is a number which renders the composition charge neutral.

28. The system of claim 27 wherein the mixed conducting metal oxide material has the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral.

29. The system of claim 28 wherein the mixed conducting metal oxide material has the general stoichiometric composition $(La_{0.4}Sr_{0.6})_wCoO_{3-\delta}$ wherein $1.05 \geq w > 0.95$ and $\delta$ is a number which renders the composition charge neutral.

30. The system of claim 25 which further comprises a combustor for combusting an oxidant gas comprising dioxygen ($O_2$) with a fuel to generate a combustion product that provides the heated oxygen-containing gas.

31. The system of claim 30 which further comprises a fired heater to further heat the heated oxygen-containing gas by indirect heat transfer with hot combustion gases in the fired heater.

32. A method of operating an ion transport membrane system comprising
(a) providing a membrane module comprising a membrane made of mixed conducting metal oxide material, wherein the membrane has a first side and a second side;
(b) heating or cooling the membrane; and
(c) while heating or cooling the membrane, contacting the first side of the membrane with a first oxygen-containing gas and contacting the second side of the membrane with a second oxygen-containing gas, wherein at any time during the heating or cooling the oxygen activity in the first oxygen-containing gas is different than the oxygen activity in the second oxygen-containing gas.

33. The method of claim 32 wherein the first and second oxygen-containing gases each comprise dioxygen ($O_2$) and wherein at any time during the heating or cooling the oxygen partial pressure in the first oxygen-containing gas is different than the oxygen partial pressure in the second oxygen-containing gas.

* * * * *